United States Patent [19]

Kyritsos et al.

[11] 4,231,913
[45] Nov. 4, 1980

[54] FLUID SHAPABLE SULFURIC COMPOSITIONS BASED ON ARYLALIPHATIC COPOLYMERS

[75] Inventors: Joseph Kyritsos, Craponne; Jean Sacco, Lyons, both of France

[73] Assignee: Rhone-Poulenc-Textile, Paris, France

[21] Appl. No.: 890,992

[22] Filed: Mar. 28, 1978

Related U.S. Application Data

[63] Continuation of Ser. No. 580,244, May 23, 1975, abandoned.

[30] Foreign Application Priority Data

May 24, 1974 [FR] France .................................. 74 18524

[51] Int. Cl.³ .............................................. C08L 77/10
[52] U.S. Cl. ................................ 260/30.8 R; 528/310; 528/312; 528/313; 528/329; 528/331; 528/336; 528/339; 528/341; 528/343; 528/345; 528/346; 528/347; 528/348
[58] Field of Search ................... 260/30.8 R; 528/339, 528/347, 346, 331, 329, 341, 348, 345

[56] References Cited

U.S. PATENT DOCUMENTS

| | | | |
|---|---|---|---|
| 3,063,966 | 11/1962 | Kwolek et al. | 260/78 R |
| 3,600,350 | 8/1971 | Kwolek | 260/32.6 |
| 3,622,545 | 11/1971 | Foldi et al. | 260/78 A |
| 3,671,542 | 6/1972 | Kwolek | 260/30.8 R |
| 3,673,143 | 6/1972 | Bair et al. | 260/30.2 |
| 3,804,791 | 4/1974 | Morgan | 260/78 R |
| 3,836,498 | 9/1974 | Gulrich et al. | 260/78 R |

FOREIGN PATENT DOCUMENTS 2134582  8/1972  France .................................. 260/78 R

OTHER PUBLICATIONS

Aubineau et al., Bulletin de la Société Chimique de France, 1970, No. 2, pp. 533–539.

*Primary Examiner*—Harold D. Anderson
*Attorney, Agent, or Firm*—Stevens, Davis, Miller & Mosher

[57] ABSTRACT

The application discloses compositions which can be shaped to form yarns, fibers, films, membranes and fibrids. They contain a particular statistical or ordered copolyamide, with an inherent viscosity of at least 1, or units containing radicals of which at least 5% are flexible radicals and the others are rigid radicals. These compositions make it possible to produce yarns, fibers, films, membranes and fibrids possessing superior mechanical properties, which find applications in the textile field, as reinforcements in composite materials in the rubber industry and coated fabrics.

4 Claims, No Drawings

FLUID SHAPABLE SULFURIC COMPOSITIONS BASED ON ARYLALIPHATIC COPOLYMERS

This is a continuation of application Ser. No. 580,244 filed May 23, 1975, now abandoned.

The present invention relates to optically anisotropic shapable compositions based on arylaliphatic copolyamides, as well as to the shaped articles produced from these compositions. It also relates to the process for the preparation of the arylaliphatic copolyamides which make it possible to prepare such compositions as well as to these copolyamides themselves.

Aromatic polyamides and poly-para-benzamides are already known as disclosed in U.S. Pat. Nos. 3,063,966 and 3,600,350, respectively, but, although their heat-resistance is mentioned in these patents, no optical property manifesting itself in a particular ordered structure of their solutions was described.

Thereafter, U.S. Pat. No. 3,673,143, and U.S. Pat. No. 3,671,542 have respectively described the preparation of optically anisotropic compositions based on particular aromatic polyamides which lead to fibers having a high initial modulus of elasticity of more than 1,500 g/tex and 2,700 g/tex, respectively. However, according to these two patents, in order to obtain this particular optical property of the solutions or spinning compositions, these polyamides generally may comprise up to about 10 mol percent of units other than the p-phenylene segment (in the case of U.S. Pat. No. 3,673,143) and p-phenylene, 4,4'-biphenylene and 1,5- or 2,6-naphthylene segments (in the case of U.S. Pat. No. 3,671,542) as well as their chlorinated derivatives. Moreover, while the second patent provides only for aromatic units as the other units, the first patent states that when these other units are not aromatic but are, for example, aliphatic, they preferably should not exceed 5% of the total number of units.

Likewise, it is known from published French Patent Application No. 2,134,582, to spin optically anisotropic compositions which are solid at ordinary temperature and which consist of a solvent which can be sulphuric acid or its chlorinated or fluorinated derivatives and a polyamide possessing chain members chosen from among —CO—$R_n$—CO—, —NH—R'—NH— and —CO—R"—NH— in which 95 mol% of the total quantity of radicals R, R' and R" are rigid radicals. Such compositions lead to yarns possessing a tenacity of at least 162 g/tex.

On the other hand, U.S. Pat. No. 3,622,545, which describes ordered and segmented arylaliphatic copolyamides, the aliphatic radicals of which possess 4 to 12 methylene groups, it being possible for the proportion in mols of aliphatic radicals to vary from 1/26 to 1/6, shows clearly that the introduction of flexible aliphatic radicals into a polymer with a rigid structure similar to the polymers described in French Application No. 2,134,582 leads to polymers which do not seem to possess the exceptional properties of the rigid polymers. In fact, according to this patent, a polymer originating from p-aminobenzoyl chloride hydrochloride, p-phenylene-diamine and adipoyl chloride, containing only 4% of flexible —$(CH_2)_4$—segments relative to the total quantity of divalent radicals, despite an inherent viscosity of 1.72, leads to yarns with very poor properties since, on issuing from the coagulating bath, their tenacity is only 19.8 g/tex and their initial modulus of elasticity is only 666 g/tex (Example 10).

Likewise, C. AUBINEAU, R. AUDEBERT and G. CHAMPETIER in Bull, de la Société Chimique de France (1970, No. 2, pages 533–539), investigating the effect of replacing polymethylene chain members by p-phenylene units, came to the conclusion that this resulted in an increase in the rigidity of the macromolecular chain, leading to an improvement in the thermal properties. However, according to these authors, these polymers, the inherent viscosity of which does not exceed 0.92, do not possess special properties even when dissolved in sulphuric acid, and this applies despite the isomorphism of certain polymethylene chain members with the p-phenylene chain member.

It has now been found, against all expectations in view of the above information, that it is possible to prepare anisotropic sulphuric compositions using particular copolyamides containing no more than 95% of rigid segments.

"Sulphuric solvent" means herein sulphuric acid itself of at least 98% strength or one of its halogenated derivatives such as chlorosulphuric acid and fluorosulphuric acid, or mixtures of these acids. If desired, the concentration of sulphuric acid in the sulphuric solvent can be higher than 100% (for example fuming sulphuric acid), but it is generally advantageous not to exceed this concentration so as to avoid excessive degradation of the polymer. The preferred sulphuric solvent is sulphuric acid at a concentration of about 99.8%.

"Sulphuric composition" means herein solutions of copolymer in a sulphuric solvent having copolymer concentrations of the order of 10 to more than 20% by weight, which solutions are fluid and optically anisotropic at ordinary temperatures or temperatures below 100° C. This means that such compositions possess all of the optical and rheological characteristics hitherto known and described only for solutions containing rigid aromatic polyamides of the poly-para-benzamide or poly-para-phenylene-terephthalamide type (compare for example French Pat. Nos. 2,010,753 and 2,134,582).

The present invention relates to fluid shapable sulfuric compositions which are optically anisotropic at temperatures below 100° C. and which comprise a statistical or ordered copolyamide with an inherent viscosity of at least 1, consisting of —CO—$R_n$—CO—, —NH—R'—NH—, and optionally —CO—R"—NH— units, in which at least 5 mol%, and preferably 5 to 35 mol%, of the total quantity of radicals R, R' and R" are flexible tetramethylene or butenylene radicals optionally substituted by one or more lower alkyl radicals or halogen atoms, the remainder of the radicals R, R' and R" consisting of rigid segments which can be identical or different and the majority of which are chosen from among p-phenylene, trans-1,4-cyclohexylene, trans-trans-1,4-buta-dienylene, 2,5-pyridylene and 1,4-[2,2,2]-bicyclooctylene segments or their substituted derivatives, it being possible for n to be 0 or 1.

The invention also relates to the yarns and fibers, which possess good mechanical properties, prepared from these solutions.

The invention also relates to the process for the preparation of the copolyamides which can form anisotropic compositions, as well as to these copolyamides themselves.

"Rigid radicals", means herein: (1) Simple rigid radicals, that is carbocyclic, aromatic or heterocyclic radicals possessing a single nucleus or several condensed nuclei, the trans-1,4-cyclo-hexylene radical, the 1,4-[2,2,2]-bicyclooctylene radical and the vinylene—CH=CH— and ethynylene-C≡C— radicals, all these radicals being bonded to the remainder of the chain via lengthwise bonds, that is by bonds which are coaxial as in the p-phenylene segment or parallel as in the 1,5-naphthylene radical and the radicals arranged in the trans form, and (2) Series of simple rigid radicals bonded together via lengthwise bonds and cyclic radicals bonded to one another via azo —N=N— or azoxy

groups.

Rigid radicals preferred for use in carrying out the present invention, include: trans-1,4-cyclohexylene, p-phenylene, 1,5- or 2,6-naphthylene, 2,5-pyridylene:

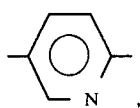

4,4'-biphenylene, trans-trans-4,4'-bicyclohexylene, 4,4'-biphenylene-trans-vinylene, 4,4'-biphenylene-trans-ethynylene and 1,4-[2,2,2]-bicyclooctylene. Trans-vinylene, ethynylene, trans-trans-2',2''-divinylene-1,4-phenylene:

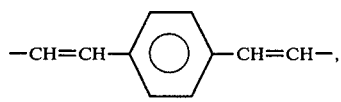

trans-trans-butadienylene and trans 2,4'-vinylene-phenylene radicals may also be used as rigid radicals, but these radicals, which can be used when they form the radical —R— of the units —CO—R—CO— cannot, however, be used for the radicals R' and R'' of the units —NH—R'—NH— and —CO—R''—NH— with the exception of the trans-vinylene-phenylene radical which can form a

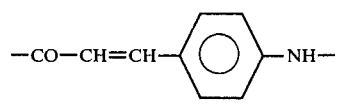

unit.

Tetramethylene and but-1-enylene or but-2-enylene radicals may be mentioned as specific flexible radicals which can be used according to the invention.

A part of the rigid radicals and/or of the flexible radicals can optionally be substituted by one or more lower alkyl radicals such as methyl, ethyl or isopropyl radicals, or by one or more halogen atoms, without going outside the scope of the invention, that is to say that the polymers which result therefrom still lead to anisotropic sulphuric solutions.

A small proportion of the —NH— groups can also optionally be substituted by an alkyl or aryl radical.

The copolymers forming the anisotropic compositions according to the invention can be statistical, ordered or semi-ordered.

Various preparation processes can be employed, depending on the copolymer which it is desired to prepare.

In order to prepare a statistical copolymer, a mixture of the chloride of a diacid possessing a flexible segment and the chloride of at least one diacid possessing a rigid segment, used either alone, in the form of a dispersion or in the molten state, or dissolved in an insert solvent such as tetramethylenesulphone, dioxane, tetrahydrofurane or the like, is reacted with at least one diamine, possessing a rigid segment or structure, dissolved in a polar solvent.

In order to prepare an ordered copolymer, a chloride of a diacid possessing a rigid segment, used alone or in the form of a solution as in the preceding case, is reacted with a preformed diamine which can possess, for example, one flexible segment and two rigid segments, and which is also dissolved in a polar solvent, or conversely, a chloride of a diacid possessing a flexible segment is reacted with a preformed diamine which can possess several rigid segments connected via carboxamide groups.

Finally, a semi-ordered or statistical copolymer can be prepared by reacting a chloride of a diacid possessing a flexible or rigid segment or a mixture of the two, used alone or in the form of a solution, with a preformed diamine which can possess one flexible segment and two rigid segments or which can consist entirely of rigid segments, or a mixture of such a preformed diamine and a simple diamine preferably possessing rigid segments, the diamine or diamines being dissolved in a polar solvent.

Finally, in the above processes, it is possible to replace a part of the diamine and of the diacid chloride by an aminoacid chloride hydrochloride.

N-methylpyrrolidone, hexamethylphosphotriamide, dimethylacetamide, tetramethylurea or a binary mixture of these products may be mentioned as polar solvents which can be used for the polycondensations described above.

The reaction is carried out in accordance with the known techniques for effecting solution polycondensation at a low temperature, that is to say at a temperature which does not exceed 100° C. and which is generally below ordinary temperature, in a practically anhydrous solvent or solvent mixture, that is to say one containing less than 300 ppm of water.

In contrast to what was known hitherto relating to the preparation of rigid polymers, the prior processes always having been carried out in a mixture of two polar solvents, it has now been found that the presence of an adipic acid derivative among the reagents makes it possible, depending on the nature and the proportions of the reagents present, to carry out the polycondensation either in a single readily available and cheap polar solvent such as N-methylpyrrolidone or dimethylacetamide, or in a binary mixture, but at higher concentrations, which is economically advantageous in industry.

The polymer thus prepared possesses an inherent viscosity of at least 1.

This polymer is then dissolved in a sulphuric solvent which can be sulphuric acid itself of at least 98% strength or more of its halogenated derivatives such as chlorosulphuric acid and fluorosulphuric acid, or mixtures of these acids.

For copolymer concentrations of the order of 10 to more than 20% by weight, the sulphuric compositions thus prepared are fluid and optically anisotropic at ordinary temperature or temperatures below 100° C.

Likewise, depending on the working conditions used, the compositions according to the present invention can possess various textures, comprising, for example, a dispersion of optically anisotropic phases in an isotropic solution, or preferentially, an optically homogeneous and essentially anisotropic medium, that is to say one which is birefringent when examined, in the relaxed state, under a microscope using polarized light.

In order to prepare the fluid sulphuric compositions which are optically anisotropic at ordinary temperature or temperatures below 100° C., according to the invention, it is possible to use copolyamides in which at least 5 mol% of the total quantity of radicals joining the various groups —CO—NH— are flexible tetramethylene or butenylene radicals, the other radicals being rigid radicals, subject to the condition, however, that the majority of these rigid radicals are chosen from among p-phenylene, trans-1,4-cyclohexylene, trans-trans-1,4-butadienylene, 2,5-pyridylene and 1,4-[2,2,2]-bicyclooctylene segments.

It is particularly surprising that copolyamides containing this proportion of flexible radicals possess the ability to form lyotropic systems with an optically ordered structure of the liquid crystal type, the entire prior art indicating that this property is specific to rigid polymers or systems (aromatic polyamides in the para arrangement, as indicated in U.S. Pat. No. 3,671,542, column 8, lines 49–52, or the helicoidal structure of polypeptides).

However, it is noted that the proportion of flexible radicals leading to copolyamides which form compositions which are optically anisotropic at temperatures below 100° C. can vary depending on the nature of the starting product containing the flexible radical and, for one and the same starting product possessing a flexible radical, can also vary depending on the nature of the other starting constituents possessing rigid radicals which take part in the polycondensation reaction.

Likewise, in the preparation of statistical and semi-ordered copolyamides, for given natures and proportions of the starting constituents, the conditions for obtaining optically anisotropic compositions vary according to the microstructure of the copolyamides formed. Differences in microstructure can be detected easily from electronic absorption spectra in the ultraviolet. Since the microstructure of the copolyamide is connected directly with the procedure used during the polycondensation reaction, the optimum working conditions which make it possible to form optically anisotropic sulphuric compositions are determined by means of simple experiments in the case of each copolyamide.

The compositions according to the invention can then be extruded, at a temperature close to or even above ordinary temperature, through a spinneret or a slit into a coagulating bath containing a coagulating agent which can be water or dilute sulphuric acid, at a low temperature. It is thus possible to form fibers, films, membranes or fibrids.

The filaments formed in the coagulating bath are then wound up at a speed which can be up to 12 times the average extrusion rate.

The yarns thus obtained directly at the outlet of the coagulating bath possess very good mechanical properties. In fact, their tenacity is almost always greater than 20 g/tex, is generally of the order of 100 g/tex, and can be as much as 200 g/tex, although they have not undergone any stretching or heat treatment. Their initial modulus of elasticity is almost always greater than 600 g/tex, is generally greater than 2,000 g/tex, and can be as much as, and can even exceed, 4,000 g/tex.

The filaments can also be subjected to a heat treatment in air or under nitrogen, under slight tension. in order further to improve the mechanical properties of the articles produced.

Some of these yarns possess good textile properties. On the other hand, others possess mechanical properties, and in particular an absolute modulus of elasticity, similar to that of glass. Taking account of the low density of these yarns, this leads to specific moduli of elasticity which are markedly higher than those of glass and consequently makes it possible to use these yarns in all those applications for glass fibers (particularly in the form of composite materials) where weight or the absence thereof, is of great importance. For example, the applications of composite materials in the transport industry and more particularly in the aviation industry, and in the sport and leisure industry, may be mentioned. Reinforcing textiles used in the rubber industry, such as in the manufacture of tires and more particularly of conveyor belts, transmission belts, pipes and the like, and coated fabrics, particularly for containers and inflatable structure, may also be mentioned. Finally, use may be made of yarns as sewing thread, where they are much appreciated because of their high tenacity, their low elongation and their virtually non-melting characteristic, enabling them to withstand overheating due to friction during machine sewing.

An advantage of the polymers according to the present invention is thus to make it possible to prepare yarns possessing a wide range of characteristics leading to extremely diversified uses.

Moreover, the presence of flexible radicals in the copolyamides according to the invention greatly facilitates their preparation and their processing because of their greater solubility, which makes it possible to carry out the polycondensation in a single simple and cheap polar solvent such as dimethylacetamide or N-methylpyrrolidone, or in a mixture of two solvents, at a higher concentration. This process is thus advantageous with respect to the type of solvent which can be used and the process for recovery of the latter with respect to the permissible concentration when a mixture is used, and with respect to the starting materials, adipic acid being a very readily available industrial product.

The following examples, in which the parts and percentages are expressed by weight unless otherwise indicated, are given by way of indication and without implying a limitation, in order to illustrate the invention.

In these examples, the inherent viscosity is measured on a solution in substantially pure sulphuric acid at 25° C. and at a concentration of 0.5 g of polymer in 100 ml of solution.

Unless otherwise stated, the mechanical properties of the yarns were measured on an apparatus bearing the trademark Instron, using an extension speed of 10% per minute and after 24 hours of conditioning at 20° C.±2 at a relative humidity of 65%±2, in 10 individual measurements on a unit strand for a 5 cm length of test piece.

The repeat distance along the $\vec{C}$ axis of a crystal lattice was determined by X-ray diffraction, using an exposure chamber of the Kiessig type, operating in a vacuum, and calibrated by means of alpha-quartz. The radiation, coming from a tube with a copper anti-cathode, passes through a nickel filter before striking the sample of yarn which is fixed to the sample-holder under a tension of 90 mg/tex. Photometry of the photograph of the diffracted radiation, along the meridian spots, makes it possible to calculate the repeat distance from the relationship $$L = \frac{n\lambda}{\sin\mu}$$

in which
L = repeat distance, in Angstroms,
n = order of diffraction,
λ = wavelength of the radiation, (namely 1.5418 Angströms) and
μ = angle between the diffracted ray and the incident ray.

For each sample of yarn, several photographs are taken (determinations are made), each photograph providing an average value of L by using the spots corresponding to the various orders of diffraction. The values recorded for L in the examples represent the averages of several photographs.

By way of example, under the test conditions, the repeat distance characteristic of poly-(p-phenyleneterephthalamide) is found to be equal to 13.15±0.04 Å (average value from 5 photographs or determinations±estimation of the standard deviation relating to this average value).

Synthesis of 4,4'-diamino-adipanilide 858 parts of technical quality p-nitro-aniline are dissolved in 2,700 parts of anhydrous N-methylpyrrolidone (60 ppm H$_2$O), the mixture being cooled to 6° C. 569 parts of adipoyl chloride are added over the course of 3 hours, while keeping the temperature of the reaction mixture below 20° C. by external cooling. The thick suspension obtained is heated to 90° C. and filtered while hot, the dinitro derivative crystallizing on cooling. After filtration, washing with methanol and drying, 1,050 parts of a light yellow product possessing the following characteristics are thus obtained:

Microanalysis

Calculated: C%: 55.96-H%: 4.70-N%: 14.50-O%: 24.84; Found: C%: 55.78-H%: 4.85-N̄%: 14.53-Ō%: 25.10.

Melting point: 282° C. (differential thermal analysis under nitrogen; test sample: 10 mg; Δθ/Δt: 15° C./minute).

UV spectroscopy (analytical quality sulphuric acid: strength: 95.6%, optically void within the entire spectrum from 200–400 nm).

$\lambda_{max}$: 288 nm; ε: 2.5×10$^4$.

Catalytic hydrogenation of the above derivative is carried out in a dimethylformamide medium at a concentration of 16%, in the presence of Raney nickel (5% relative to the dinitro compound) for 1 hour, under a hydrogen pressure less than or equal to 40 bars and at a temperature of between 95° and 135° C. After removing the catalyst and adding boiling water to the filtrate until the cloud point is reached, the filtrate being kept at 100° C., the diamine crystalizes on cooling in the form of broad pearlescent flakes. After washing with water and then with methanol and drying in a vacuum, a pure diamine, possessing the following analytical characteristics, is obtained in 93% yield:

MICROANALYSIS

Calculated: C%: 66.24-H%: 6.79-N%: 17.17-O%: 9.80; Found: C̄%: 66.10-H̄%: 6.86-N̄%: 17.24-Ō%: 9.93.

Melting point (differential thermal analysis Δθ/Δt: 15° C./minute): 239° C.

EXAMPLES 1 TO 3

A mixture of adipoyl chloride and terephthaloyl chloride dissolved, at ordinary temperature, in tetramethylenesulphone is added gradually, with vigorous stirring, to a solution of p-phenylene-diamine in a mixture of hexamethylphosphotriamide (HMPT) and N-methylpyrrolidone (NMP) in a proportion of 70/30 by weight.

The working conditions are as follows:

| Example No. | 1 | 2 | 3 |
|---|---|---|---|
| Adipic segments % | 25 | 30 | 33 |
| Solution of the acid chlorides: | | | |
| Adipoyl chloride (parts) | 76.98 | 93.18 | 104.15 |
| Terephthaloyl chloride (parts) | 85.39 | 68.91 | 57.76 |
| Tetramethylenesulphone (parts) | 160 | 160 | 160 |
| Amine solution: | | | |
| p-phenylene-diamine (parts) | 90.97 | 91.76 | 92.30 |
| HMPT/NMP mixture (parts) | 925 | 1,010 | 1,010 |
| Initial temperature | −13° C. | −10° C. | −10° C. |
| Polycondensation: | | | |
| Time taken to add the chlorides | 20 mins. | 25 mins. | 25 mins. |
| Temperature at the end of adding the chlorides | 26° C. | 9° C. | 7° C. |
| Reaction time at ordinary temperature | 1 hr. | 1 hr. 30 mins. | 1 hr. 40 mins. |
| Inherent viscosity | 2.10 | 2.63 | 1.78 |

On dissolution in pure sulphuric acid, the above copolyamides form solutions which are optically anisotropic at ordinary temperature (20°–25° C.) at concentrations close to those mentioned below.

These solutions are spun through a spinneret possessing 30 orifices of diameter of 0.06 mm, situated 5 mm above the surface of the coagulation bath consisting of water at 5° C. The yarn then passes through a vertical tube of length 150 mm and internal diameter 6 mm, the inlet orifice of which is situated 28 mm below the surface of the bath.

The spinning conditions characteristic of each of the examples are:

| | Example 1 | Example 2 | Example 3 |
|---|---|---|---|
| Concentration | 16.3% | 17.7% | 19.5% |
| Extrusion temperature | 7° C. | 26° C. | 26° C. |
| Winding-up speed in m/minute | 37 | 17 | 8 |
| Ratio of winding-up speed to average extrusion speed | 5.8 | 1.1 | 0.9 |

The mechanical properties are as follows:

| | Example 1 | Example 2 | Example 3 |
|---|---|---|---|
| Gauge in dtex | 1.44 | 8.34 | 19.9 |
| Tenacity in g/tex | 48.2 | 42.2 | 23.6 |
| Elongation % | 9.4 | 15.4 | 30.8 |
| Initial modulus of | | | |

| | Example 1 | Example 2 | Example 3 |
|---|---|---|---|
| elasticity in g/tex | 1,580 | 1,025 | 600 |

On X-ray examination (6 measurements), the repeat distance characteristic of the yarn of Example 1 is equal to 13.31±0.09 Å.

EXAMPLE 4

A polymer possessing the following recurrent units:

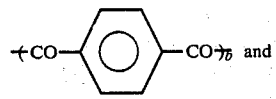

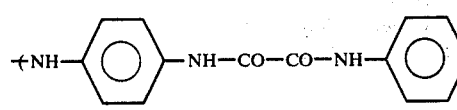

in which the proportion of flexible segments:
$a/(a+b+2c)$ (with the last unit possessing 2 rigid segments) represents 16.6%, is prepared by gradually adding a solution containing:

| adipoyl chloride | 28.13 parts, |
|---|---|
| terephthaloyl chloride | 31.20 parts and |
| tetramethylenesulphone | 120 parts | to a suspension containing 83.09 parts of 4,4′-diaminooxanilide and 26.06 parts of lithium chloride in 1,055 parts of a mixture of HMPT and NMP in a proportion of 70/30 by weight. Polycondensation is effected at 20° C. and the polymer obtained possesses an inherent viscosity of 3.15.

It is dissolved in 99.85% pure sulphuric acid and leads to optically anisotropic solutions at concentrations greater than or equal to 16.8%.

A 16.8% strength solution of this optically anisotropic terpolyamide in sulphuric solvent is extruded at 25° C., as in Example 1, with a winding-up speed of 80 m/minute and a ratio of winding-up speed to average extrusion speed of 8.5.

Mechanical characterisitcs of the yarns obtained:

| Gauge | 1.02 dtex |
|---|---|
| Tenacity | 101 g/tex |
| Elongation at break | 4.1% |
| Initial modulus of elasticity | 3,430 g/tex |

EXAMPLE 5

A copolyamide possessing the following recurrent units:

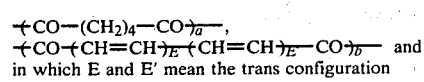

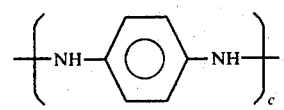

in which the proportion of flexible segments:
$a/(a+b+c)$ represents 25%, is prepared.

A solution consisting of 60.94 parts of adipoyl chloride, 59.60 parts of trans-trans-muconoyl chloride and 120 parts of tetramethylenesulphone is added, over the course of 40 minutes, to a solution, cooled to −10° C., comprising 72.01 parts of p-phenylene-diamine dissolved in 1,000 parts of a 70/30 by weight mixture of hexamethylphosphotriamide and N-methylpyrrolidone, the temperature of the reaction mixture being kept below 13° C. by external cooling. One hour after starting to add the chlorides, the orange-red viscous paste obtained is precipitated by adding water, and the polymer is filtered off, washed with water and then with methanol and dried in a vacuum at 80° C.; its inherent viscosity is 2.39.

An optically anisotropic sulphuric composition comprising 17.3% of the above copolyamide dissolved in pure sulphuric acid (99.85%) is extruded at 22° C. through a spinneret, possessing 300 orifices of diameter of 0.060 mm, immersed in a bath of water kept at 12° C.

| Length of the coagulation path: | 30 cm |
|---|---|
| Winding-up speed: | 2.5 m/minute |
| Ratio of winding-up speed to average extrusion speed: | 1.9 |

After washing and drying at ordinary temperature on a bobbin, the yarn obtained possesses the following tensometric properties:

| Gauge: | 4.5 dtex |
|---|---|
| Tenacity: | 23.4 g/tex |
| Elongation at break: | 17.7% |
| Initial modulus of elasticity: | 772 g/tex |

EXAMPLE 6

A statistical terpolyamide possessing the following recurrent units:

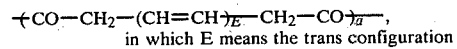
in which E means the trans configuration

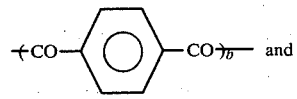

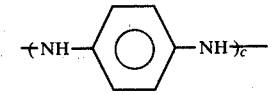

in which $a/(a+b+c)$ represents 12.5%, is prepared in the following way.

A solution comprising 50.17 parts of trans-β-dihydromuconoyl chloride, 112.54 parts of terephthaloyl chloride and 200 parts of tetramethylenesulphone is added, over the course of 1 hour, with vigorous stirring, to a solution, cooled to −10° C., of 89.92 parts of p-phenylene-diamine dissolved in 1,000 parts of an HMPT/NMP mixture (70/30 by weight), the temperature of the reaction mixture being kept below 8° C. After precipitation, filtration and washing with water and then with methanol, the isolated copolyamide is dried in a vacuum at 80° C. to constant weight. Its inherent viscosity is 2.45.

On dissolving this copolyamide at 30° C. in pure sulphuric acid (99.85%), a solution (i.e. sulphuric composition) is obtained which, at a concentration of 18%, is very viscous and optically anisotropic when examined under a microscope using polarized light.

EXAMPLES 7 AND 8

Two statistical copolyamides possessing the following recurrent units:

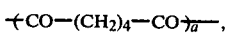

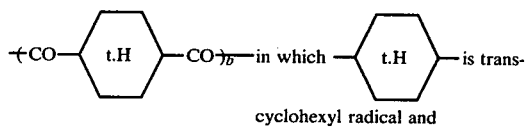

cyclohexyl radical and

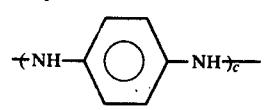

in which a/(a+b+c) represent respectively 10% (Example 7) and 25% (Example 8), are prepared under the following conditions:

|  | Example 7 | Example 8 |
|---|---|---|
| Flexible segments % | 10% | 25% |
| Adipoyl chloride | 11.21 | 29.42 |
| Trans-hexahydroterephthaloyl chloride | 50.7 | 33.27 |
| Tetramethylenesulphone | 140 | 79 |
| p-phenylene-diamine | 33.10 | 34.76 |
| 70/30 HMPT/NMP mixture | 735 | 543 |
| Initial temperature | −11° C. | −10° C. |
| Time taken to add the chlorides | 25 mins. | 30 mins. |
| Temperature at the end of adding the chlorides | −6° C. | +4° C. |
| Reaction time at ordinary temperature | 90 mins. | 90 mins. |
| Inherent viscosity obtained | 1.45 | 1.20 |

At concentrations by weight above 14% (Ext) and 17% (R+8) in a sulphuric solvent, respectively, the two copolyamides form sulphuric compositions which are liquid and optically anisotropic at ordinary temperature.

An optically anisotropic composition, comprising 18.3% concentration solution of the copolyamide of Example 8 in 99.8% strength sulphuric acid is wet-extruded vertically, at 22° C., through a non-immersed spinneret possessing 30 orifices of diameter 0.05 mm, situated 5 mm above the coagulation bath consisting of 30% strength sulphuric acid at −10° C.

The bundle of filaments passes over a fixed finger situated 20 mm below the surface of the bath and then issues from the bath at 80 m/minute after a total path through the coagulation bath of 150 mm. The ratio of the winding-up speed to the average extrusion speed is 3.2.

MECHANICAL PROPERTIES

| Gauge: | 2.02 dtex |
|---|---|
| Tenacity: | 37 g/tex |
| Elongation at break: | 5.7% |
| Initial modulus of elasticity: | 1,185 g/tex |

Likewise, an optically anisotropic composition comprising a 17.5% concentration solution of the copolyamide of Example 7 in pure sulphuric acid is extruded at 25° C. under similar conditions, the only variants in the procedure being as follows: Spinneret possessing 30 orifices of diameter 0.06 mm Coagulation bath: water at 5° C.

Use of a vertical tube of length 150 mm and internal diameter 6 mm, the inlet orifice being situated 30 mm below the water level.

Winding-up speed: 100 m/minute corresponding to a ratio of winding-up speed to average extrusion speed of 5.7.

MECHANICAL PROPERTIES

| Gauge: | 1.6 dtex |
|---|---|
| Tenacity: | 53.9 g/tex |
| Elongation at break: | 4.6% |
| Modulus of elasticity: | 2,310 g/tex |

EXAMPLE 9

An ordered copolyamide of the formula:

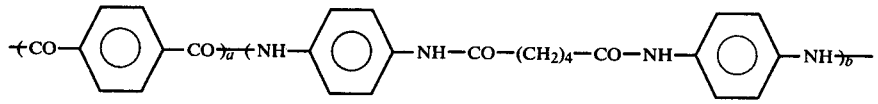

in which the ratio of flexible segments to the total quantity of segments: b/(a+3b) (wherein each unit with the index b has 1 flexible segment out of 3 segments) represents 25%, is prepared.

100 parts of lithium chloride and 489.6 parts of 4,4'-diamino-adipanilide are dissolved, by heating to 40° C., in 3,380 parts of a 70/30 by weight mixture of hexamethylphosphotriamide (HMPT) and N-methylpyrrolidone (NMP). After cooling to −15° C., 304.5 parts of pulverulent terephthaloyl chloride are added, all at once and with very vigorous stirring. After reacting for 7 minutes, the temperature of the viscous reaction mixture obtained reaches 16° C. and then rises gradually to 20° C., and this temperature is maintained, with stirring, for 1 hour 30 minutes. The polymer formed is recovered by adding water, filtering off, washing and drying. Its inherent viscosity is 1.84.

The above copolyamide can advantageously be prepared under similar working conditions and at a concentration of 10% by using only N-methylpyrrolidone as the low temperature polycondensation solvent. Inherent viscosity: 1.74.

193 parts of this ordered copolyamide are dissolved at ordinary temperature in 807 parts of 99.8% pure sulphuric acid to form a sulphuric composition which possesses a silvery metallic luster when stirred and which is optically anisotropic (examination under a microscope using polarized light). This solution is extruded at 28° C. on a spinning position similar to that of Example 1, but through a spinneret possessing 100 orifices of diameter 0.060 mm. After passing over a fixed finger, the yarn is wound up at a speed of 80 m/minute, which corresponds to a ratio of winding-up speed to average extrusion speed of 11.1. After washing and drying on a bobbin, the yarn thus obtained possesses the following average tensometric properties:

| Unit gauge: | 0.89 dtex |
|---|---|
| Tenacity: | 97 g/tex |
| Elongation at break: | 6.9% |
| Initial modulus of elasticity: | 2,085 g/tex |

On X-ray examination, the $\vec{C}$ axis module, corresponding to the length L of the sequence below:

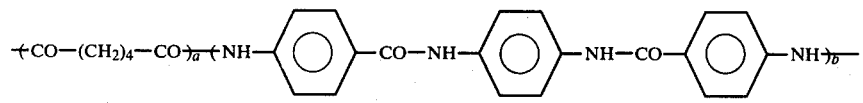

is found to be equal to $26.82 \pm 0.10$ Å (4 measurements-average value±estimation of the standard deviation S).

EXAMPLE 10

An ordered copolyamide of the formula

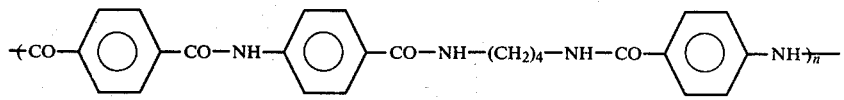

containing 25% of flexible segments, is prepared.

136.58 parts of N,N'-p-phenylene-bis-(p-aminobenzamide) are dissolved at 100° C. in a solvent mixture comprising 700 parts of hexamethylphosphotriamide, 300 parts of N-methylpyrrolidone and 16.7 parts of lithium chloride, all the solvents being anhydrous. After cooling to 12° C., 72.17 parts of adipoyl chloride are added, over the course of 30 minutes to the suspension of the recrystallized diamine, the temperature of the reaction mixture being kept below 22° C. for the entire duration of the addition. After standing for 16 hours at ordinary temperature the viscous mixture obtained is precipitated in water, and the polymer recovered which, after being washed and dried, has an inherent viscosity of 2.0.

Above a critical concentration of 17%, the above copolyamide forms a fluid sulphuric composition which is optically anisotropic at ambient temperature (25° C.) and which possesses a silver-grey metallic luster on stirring at low speed. This solution is suitable for spinning and film-formation.

EXAMPLE 11

The following comparative example makes it possible to emphasize the specific and unexpected nature of the results described above by demonstrating that an ordered copolyamide possessing a related structure and viscometric and geometric characteristics similar to those of Examples 9 and 10 does not possess the ability to form sulphuric compositions which are optically anisotropic and liquid at ordinary temperature.

An ordered copolyamide derived from terephthalic acid, p-aminobenzoic acid and tetramethylenediamine, having the following repeat unit:

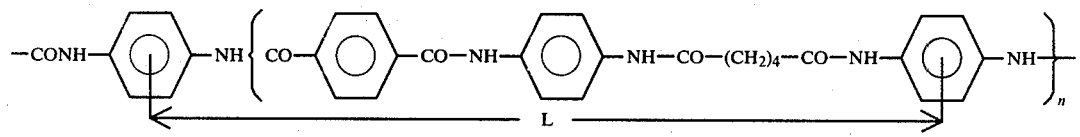

in which the proportion of flexible segments out of all the segments is 25%, is prepared.

47.5 parts of anhydrous lithium chloride and 228.48 parts of N,N'-tetramethylene-bis-(p-aminobenzamide) are dissolved at 60° C., under dry nitrogen, in a mixture comprising 1,106 parts of hexamethylphosphotriamide and 474 parts of N-methylpyrrolidone (mixture containing 50 parts per million of water).

After cooling to −5° C., 142.12 parts of terephthaloyl chloride are introduced over the course of 15 seconds with rapid stirring, the temperature of the reaction mixture rising gradually to 29° C. over the course of 25 minutes. After standing for 12 hours at ordinary temperature, 315 parts of the copolyamide, the inherent viscosity of which is 1.82, are recovered by means of a treatment and washing with water followed by drying at 120° C. in a vacuum.

In contrast to the preceding examples, it is not possible, using this copolyamide, to prepare sulphuric compositions which are liquid and optically anisotropic at ordinary temperature.

On spinning an isotropic sulphuric composition in the convention manner and examining the product by means of X-ray, the length of the sequence L'

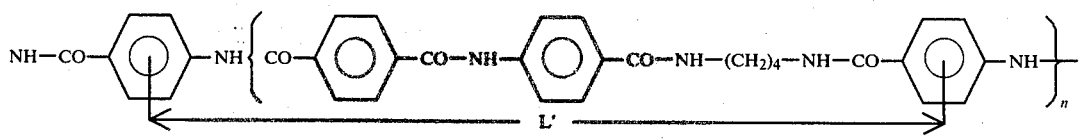

is found to be equal to 26.03±0.02 A (4 measurements).

Thus, for the three ordered copolyamides of Examples 9, 10 and 11, possessing related structures and similar characteristics, it is possible to alter radically the ability to form sulphuric compositions which are liquid and optically anisotropic at ordinary temperature, by simply reversing the two carboxamide groups —CO—NH— joining the terephthalanilide sequences to the flexible tetramethylene radicals —$(CH_2)_4$—.

EXAMPLE 12

An essentially statistical copolyamide possessing the following recurring units:

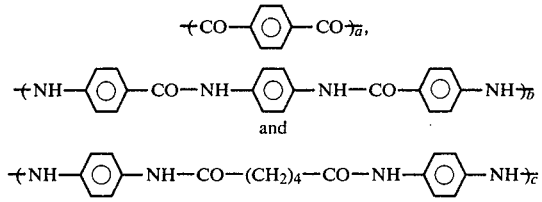

in which the proportion of flexible segments $c/(a+3b+3c)$ is ⅛ or 12.5%, is prepared.

26.7 parts of N,N'-p-phenylene-bis-(p-aminobenzamide) and 25.2 parts of 4,4'-diamino-adipanilide are dissolved at 70° C., under a stream of dry nitrogen, in a solvent mixture comprising 560 parts of hexamethylphosphotriamide, 560 parts of N-methylpyrrolidone and 6.5 parts of lithium chloride. After cooling to 5° C., 31.3 parts of pulverulent terephthaloyl chloride are added all at once, with vigorous stirring. After stirring for two hours at ambient temperature, the viscous mixture obtained is precipitated in water and the polymer, which is filtered off, washed and dried in a vacuum at 80° C., possesses an inherent viscosity of 2.60.

An optically anisotropic fluid sulphuric composition containing 22.0% of this polymer is extruded under the following conditions:

Extrusion temperature: 24° C.
Spinneret: 25 orifices of diameter 0.060 mm, situated 5 mm above a bath of water at 5° C.
Winding-up speed: 100 m/minute, corresponding to a spinneret stretching ratio of 11.6
Gauge: 0.99 dtex
Tenacity: 113.6 g/tex
Elongation: 4.1%
Initial modulus of elasticity: 3,795 g/tex.

EXAMPLES 13 TO 15

Polycondensation

Three essentially statistical copolyamides possessing the following recurrent units:

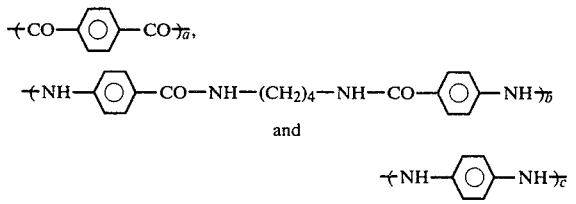

in which the proportion of flexible segments $b/(a+3b+c)$ is 5%, 10% and 20% respectively, are prepared from N,N'-tetramethylene-bis-(p-aminobenzamide), p-phenylene-diamine and terephthaloyl chloride, under the following conditions:

| | Example 13 | Example 14 | Example 15 |
|---|---|---|---|
| Proportion of flexible segments | 5% | 10% | 20% |
| Terephthaloyl chloride (parts) | 1,015.13 | 304.54 | 203.03 |
| N,N'-Tetramethylene-bis-(p-aminobenzamide) (parts) | 181.33 | 122.40 | 217.60 |
| p-Phenylene-diamine (parts) | 480.64 | 121.66 | 36.05 |
| Lithium chloride (parts) | 0 | 0 | 25 |
| HMPT/NMP mixture (in parts) | 9,260 | 4,330 | 2,735 |
| Composition: (HMPT/NMP) | (65/35) | (50/50) | (65/35) |
| Initial temperature | −11° C. | 0° C. | 0° C. |
| Time taken to add the chloride | 15 secs. | 15 secs. | 15 secs. |
| Maximum temperature reaches | 27° C. | 32° C. | 40° C. |
| Reaction time at ambient temperature | 12 hrs. | 12 hrs. | 12 hrs. |
| Inherent viscosity | 4.86 | 3.95 | 2.93 |

SPINNING

A sulphuric composition comprising 191 parts of the copolyamide prepared as in Example 13 above, and 809 parts of pure sulphuric acid of strength 99.95% is extruded at 78° C. under the same conditions as in Example 1, but through a spinneret possessing 100 orifices of diameter 0.060 mm and with a winding-up speed of 200 m/minute corresponding to a ratio of winding-up speed to average extrusion speed of 6.8. After washing and drying at ordinary temperature on a bobbin, the yarn obtained possesses the following average tensometric properties.

Unit gauge: 1.43 dtex
Elongation at break: 4.9%
Tenacity: 198 g/tex
Initial modulus of elasticity: 3,380 g/tex.

A sulphuric composition comprising a 13.5% concentration solution of the copolyamide of Example 14 dissolved in pure sulphuric acid (strength: 99.85%) is optically anisotropic and enables strong homogeneous thin films to be produced by wet film-formation (coagulation in sulphuric acid of concentration 50%; temperature: 24° C.).

When the copolyamide of Example 15 is mixed, at a concentration of 21.0%, with pure sulphuric acid, it yields a maleable homogeneous paste which, on heating at 60°–65° C. (temperature of the hot plate) forms a highly anisotropic fluid sulphuric composition, as seen by examination under polarized light.

These Examples 13 to 15 show clearly that the failure of Example 11 does not arise from the use of N,N'-tetramethylene-bis-(p-aminobenzamide).

EXAMPLE 16

A copolyamide possessing the following recurrent units:

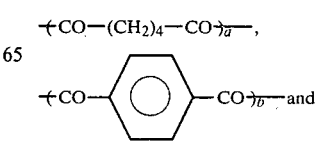

-continued

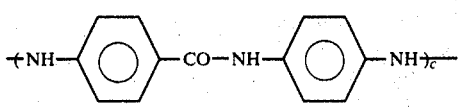

in which the proportion of flexible segments a/-(a+b+2c) is 25%, is prepared.

To do this, 95.6 parts of 4,4'-diamino-benzanilide and 13.5 parts of lithium chloride are dissolved in 1,056 parts of a 70/30 by weight mixture of hexamethylphosphotriamide and N-methylpyrrolidone. A liquid mixture comprising 21.35 parts of terephthaloyl chloride, 57.74 parts of adipoyl chloride and 67 parts of anhydrous tetramethylenesulphone is added, over the course of 50 minutes, to the above solution which is cooled to $-7°$ C., the temperature of the reaction mixture being kept at between $-3°$ and $-7°$ C. for the entire duration of the addition. After stirring for 2 hours at ordinary temperature, the polymer is precipitated by adding water, and is washed and dried. Its inherent viscosity is 2.35.

20.6 parts of this dry polymer are dissolved at ordinary temperature in 79.4 parts of 99.8% pure sulphuric acid. After degassing in a vacuum, the optically anisotropic fluid sulphuric composition thus obtained is extruded at 22° C. on a wet-spinning station similar to that of Example 1, but through a spinneret possessing 30 orifices of diameter 0.050 mm, situated 5 mm above the coagulation bath consisting of 30% strength sulphuric acid kept at $-10°$ C.

The vertical cylindrical tube, of length 150 mm, possesses an internal diameter of 6 mm which is reduced to 3 mm at the outlet, the inlet orifice being 28 mm below the surface of the coagulation bath, the free flow of the bath in the absence of yarn taking place at an average speed estimated to be 100 m/minute.

Winding-up speed: 80 m/minute
Ratio of winding-up speed to average extrusion speed: 7.6

The yarn thus obtained possesses the following average tensometric properties:

Unit gauge: 0.97 dtex
Dry tenacity: 83 g/tex
Elongation at break: 5.6%
Initial modulus of elasticity: 2,210 g/tex Another sample of yarn prepared under similar conditions is subjected to a heat treatment under nitrogen by being passed through a 2 m tube heated to 320° C., the input speed being 5 m/minute and the winding-up speed 5.20 m/minute. The following average mechanical properties are obtained:

Gauge: 0.86 dtex
Tenacity: 121 g/tex
Elongation: 1.8%
Initial modulus of elasticity: 5,960 g/tex.

EXAMPLE 17

A copolyamide derived from 4,4'-diamino-benzanilide and from an equimolecular mixture of adipoyl chloride and terephthaloyl chloride (which leads to 16.6% of flexible segments) is prepared under conditions similar to those of Example 16, the initial temperature being $-8°$ C., the time taken to add the solution of chlorides being 40 minutes and the temperature of the reaction mixture at the end of the addition being 0° C. The inherent viscosity of the polymer obtained is 2.65.

A sulphuric composition of this copolymer, comprising a 20.1% concentration solution thereof in a sulphuric solvent, is optically anisotropic and possesses a silvery metallic luster on stirring at low speed.

This solution is extruded under working conditions identical to those described in Example 16, but with:

Extrusion temperature: 25° C.
Spinneret possessing 30 orifices of 0.06 mm
Ratio of winding-up speed to average extrusion speed: 7.3

After washing and drying at ordinary temperature on a bobbin, the yarn obtained possesses the following average tensometric properties:

Gauge: 1.43 dtex
Tenacity: 93 g/tex
Elongation at break: 4.3%
Initial modulus of elasticity: 3,140 g/tex

EXAMPLE 18

A copolyamide derived from 4,4'-diamino-benzanilide, comprising 90% of adipic acid relative to the total quantity of diacids employed (which corresponds to 30% of flexible segments) is prepared under conditions similar to those of example 16 in the absence of tetramethylenesulphone, the mixture of chlorides being liquid at ordinary temperature. Its inherent viscosity is 2.30.

On dissolution in pure sulphuric acid (99.85% strength), it is possible to obtain, at ordinary temperature (24° C.), a sulphuric composition, the apparent viscosity of which decreases suddenly beyond a concentration of 17.7%, at the same time as the characteristics of optical anisotropy appear, it being possible to detect these characteristics by examination under a microscope, using polarized light. A composition which is fluid at ambient temperature and the concentration of which is 21.5% is extruded at ordinary temperature into water at 5° C. and under conditions similar to those of Example 16, the winding-up speed being 80 m/minute and the ratio of winding-up speed to average extrusion speed being 7.0.

A yarn possessing the following properties is obtained:

Gauge: 1.61 dtex
Tenacity: 47.3 g/tex
Elongation at break: 7.6%
Initial modulus of elasticity: 1,290 g/tex

EXAMPLE 19

A copolyamide of the formula:

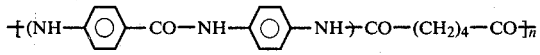

comprising 33.3% of flexible segments, is prepared.

173.6 parts of adipoyl chloride are added, over the course of 40 minutes, to a solution, cooled to $-9°$ C., comprising 215.56 parts of 4,4'-diamino-benzanilide and 40.2 parts of lithium chloride in 1,680 parts of a mixture of hexamethylphosphotriamide and N-methylpyrrolidone (70/30 by weight), the temperature of the reaction mixture being kept below 11° C. The polymer obtained possesses an inherent viscosity of 1.90.

A sulphuric composition containing 34.5% of this polymer is fluid and optically anisotropic in the vicinity of 50° C.

EXAMPLE 20

An essentially statistical copolyamide possessing the following recurrent units:

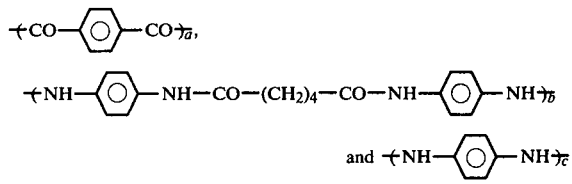

in which the proportion of flexible segments b/(a+3b+c) is 10%, is prepared.

812.10 parts of pulverulent terephthaloyl chloride are added, over the course of 20 seconds, and with very vigorous stirring, to a solution, cooled to −5° C., comprising:
- 326.40 parts of 4,4′-diamino-adipanilide,
- 324.43 parts of p-phenylene-diamine and
- 8,295 parts of a 65/35 by weight mixture of hexamethylphosphotriamide and N-methylpyrrolidone, the temperature of the reaction mixture rising to 20° C.

After stirring for 45 minutes at ambient temperature, the powdery mixture obtained is treated with 5,000 parts of water. After filtration and washing, the copolyamide is dried in a vacuum at 140° C. to constant weight. Its inherent viscosity is 3.99.

An optically anisotropic sulphuric composition comprising 185 parts of the above copolyamide and 815 parts of pure sulphuric acid (99.85%) is wet-extruded at 66° C. on a vertical spinning station through a tube similar to that of Example 1 but with the following changes:

Spinneret possessing 100 orifices of diameter 0.060 mm, situated 10 mm above a bath of water at 5° C., the bundle of filaments formed and the coagulating medium passing through a tube of length 150 mm and diameter 6 mm, the inlet orifice of which is 28 mm below the water level. Winding-up speed: 100 m/minute. Ratio of winding-up speed to average extrusion speed: 7.4.

After thorough washing and drying on the bobbin at ordinary temperature, the yarn obtained possesses the following mechanical properties (measurements made on elementary filaments—averages of 5 measurements):
- Gauge: 1.27 dtex
- Tenacity: 180 g/tex
- Elongation: 5.2%
- Initial modulus of elasticity: 3,850 g/tex

EXAMPLE 21

42.08 parts of pulverulent terephthaloyl chloride are added, all at once and with vigorous stirring, to a solution, cooled to 0° C., comprising:
- 33.83 parts of 4,4′-diamino-adipanilide,
- 11.23 parts of p-phenylene-diamine and
- 1,110 parts of a 50/50 by weight mixture of anhydrous hexamethylphosphotriamide and anhydrous N-methylpyrrolidone (≦55 ppm H₂O), and this leads to a proportion of flexible segments of 16.6%. At the end of adding the chlorides, the ice bath used for cooling is removed. The homogeneous viscous mixture obtained is stirred for 2 hours at ordinary temperature and then the copolyamide obtained is precipitated, washed and dried in a vacuum at 140° C. Its inherent viscosity is 1.73.

It is then dissolved at ordinary temperature ($\leq 25°$ C.) in 99.85% pure sulphuric acid in order to prepare a sulphuric composition of concentration 18.0%, which, on stirring at low speed, shows a pronounced opalescence, (luster, and silvery metallic sheen). On examination under a microscope using polarized light, this solution possesses wide highly colored zones and exhibits high optical anisotropy. This fluid solution is extruded under conditions similar to those of Example 1 but with the following changes:
- Extrusion temperature: 25°–30° C.
- Coagulation bath: water at 15° C.
- Estimated speed of the bath through the vertical tube: 100 m/minute
- Estimated average extrusion speed: 21 m/minute
- Ratio of winding-up speed to average extrusion speed: 4.7
- Rate at which the coagulated yarn is pulled: 100 m/minute.

After washing, drying and conditioning, the yarn thus obtained possesses the following characteristics (measurements on elementary filaments—averages of 20 measurements):
- Gauge: 2.23 dtex
- Tenacity: 64 g/tex
- Elongation at break: 7.1%
- Initial modulus of elasticity: 2,035 g/tex.

EXAMPLE 22

An ordered copolyamide of the formula:

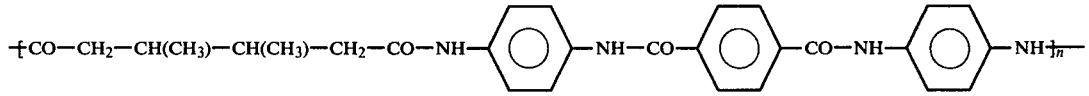

which comprises 25% of flexible segments derived from 3,4-dimethyl-adipic acid, is prepared by the slow addition, over the course of 25 minutes, at 20° C., of 46 parts of the acid chloride to 75.5 parts of 4,4′-diamino-terephthalanilide dissolved in 930 parts of a 70/28/2 mixture of hexamethylphosphotriamide, N-methylpyrrolidone and LiCl. Inherent viscosity of the polymer: 1.55.

An 18.0% strength solution in 99.87% pure sulphuric acid is a fluid and optically anisotropic sulphuric composition at ambient temperature.

It is extruded as in Example 1, but at ambient temperature, with a winding-up speed of 75 m/minute and a ratio of winding-up speed to average extrusion speed of 4.8.

After washing, the filaments possess the following characteristics:
- Gauge: 1.9 dtex
- Tenacity: 44 g/tex
- Elongation at break: 5.4%
- Initial modulus of elasticity: 1,750 g/tex The examples show that when R′ is flexible it can only be present as tetramethylene or substituted tetramethylene, in an amount of 5 to 20 mol% of the total quantity of radicals R, R′, and R″ and in the sequence:

—NH—R"—CO'NH—R'—NH—CO—R"—NH— where no —CO—R"—NH— unit is directly linked to another —CO—R"—NH— unit.

Although specific components and designated proportions and arrangements of elements have been stated in the above description of the preferred embodiments of this invention, other suitable equivalent components and arrangements of elements may be used for satisfactory results and various degrees of quality, or other modifications may be made in this system to synergize or enhance its construction to thereby increase its utility. It will be understood that such changes of details, materials, arrangements of parts and uses of the invention described and illustrated herein are intended to be included within the principles and scope of the claimed invention.

What is claimed is:

1. A fluid, shapable, sulphuric composition which is optically anisotropic at temperatures below 100° C., consisting essentially of a sulphuric solvent and a solute which consists essentially of a copolyamide with a fiber forming inherent viscosity of at least 1 when measured on a solution in substantially pure sulphuric acid at 25° C. and at a concentration of 0.5 g of polymer in 100 ml of solution, consisting of units selected from the group consisting of: —CO—$R_n$—CO, —NH—R'—NH, and —CO—R"—NH units wherein 5–35 mol% of the total quantity of radicals R, R' and R" are flexible radicals selected from the group consisting of tetramethylene radicals, butenylene radicals, and tetramethylene or butenylene radicals substituted by one or more lower alkyl or halogen radicals; the remainder of the radicals, R, R' and R" consisting of rigid segments which can be identical or different and the majority of which are selected from the group consisting of p-phenylene, trans-1,4-cyclohexylene, trans-trans-1,4-butadienylene, and 2,5-pyridylene segments or their derivatives substituted by one or more lower alkyl or halogen radicals; and wherein n is 0 or 1 provided that when R' is flexible it can only be present as tetramethylene or substituted tetramethylene, in an amount of 5–20 mol% of the total quantity of radicals R, R' and R" and in the sequence:

—NH—R"—CO—NH—R'—NH—CO—R'—NH— and that no unit —CO—R"—NH— is linked directly to another —CO—R"—NH—, said copolyamide consisting essentially of at least 10% by weight of the composition.

2. The composition of claim 1 wherein said units are selected from the group consisting of —CO—$R_n$—CO— and —NH—R'—NH—

3. The composition of claim 1 wherein the sulphuric solvent consists of concentrated sulphuric acid of at least 98% strength.

4. The composition of claim 1, wherein the sulphuric solvent consists of an acid selected from the group consisting of: sulphuric acid, chlorosulphuric acid, fluorosulphuric acid and mixtures thereof.

* * * * *